United States Patent
May

(10) Patent No.: US 11,929,204 B2
(45) Date of Patent: Mar. 12, 2024

(54) MAGNETIC DRIVE THAT USES AN EXTERNAL MAGNETIC FIELD

(71) Applicant: TOMORROW'S MOTION GMBH, Berg (DE)

(72) Inventor: Lutz May, Berg (DE)

(73) Assignee: TOMORROW'S MOTION GMBH, Starnberg (DE)

( * ) Notice: Subject to any disclaimer, the term of this patent is extended or adjusted under 35 U.S.C. 154(b) by 336 days.

(21) Appl. No.: 17/594,170

(22) PCT Filed: Apr. 8, 2020

(86) PCT No.: PCT/EP2020/060056
§ 371 (c)(1),
(2) Date: Oct. 5, 2021

(87) PCT Pub. No.: WO2020/208089
PCT Pub. Date: Oct. 15, 2020

(65) Prior Publication Data
US 2022/0181059 A1 Jun. 9, 2022

(30) Foreign Application Priority Data
Apr. 9, 2019 (EP) ..................................... 19168207

(51) Int. Cl.
*H01F 7/08* (2006.01)
*H01F 7/06* (2006.01)

(52) U.S. Cl.
CPC ............. *H01F 7/081* (2013.01); *H01F 7/064* (2013.01)

(58) Field of Classification Search
CPC ......... H01F 7/064; H01F 7/081; H02K 11/33; H02K 33/18; H02K 2213/03

(Continued)

(56) References Cited

U.S. PATENT DOCUMENTS

| | | | | |
|---|---|---|---|---|
| 5,912,608 A | * | 6/1999 | Asada | ..................... H02K 33/18 335/229 |
| 6,937,125 B1 | * | 8/2005 | French | ................... G09B 27/08 40/430 |

(Continued)

FOREIGN PATENT DOCUMENTS

JP 03230743 A * 10/1991
JP H03230743 A 10/1991

OTHER PUBLICATIONS

Machine translation of Hirose et al. Japanese Patent Document H03-230743 A Oct. 1991 (Year: 1991).*

*Primary Examiner* — Kevin J Comber
(74) *Attorney, Agent, or Firm* — Fay Kaplun & Marcin, LLP

(57) ABSTRACT

A magnetic drive includes a base plate, an energy source mounted to the base plate, a control unit, a first magnetic field generator, and a switching circuit. The energy source and the first magnetic field generator are interconnected by the switching circuit. The control unit is configured to control the switching circuit to provide energy to the first magnetic field generator. The first magnetic field generator is configured to generate a magnetic field when being supplied with energy. The control unit is configured to control the switching unit to achieve a desired polarity of the generated magnetic field to interact with the external magnetic field so that a rotational force selectively in clockwise or counterclockwise direction is generated to rotate the first magnetic field generator within the external magnetic field in a desired direction of rotation.

19 Claims, 9 Drawing Sheets

(58) Field of Classification Search
USPC .......................................................... 361/160
See application file for complete search history.

(56) References Cited

U.S. PATENT DOCUMENTS

2007/0282378 A1* 12/2007 Huang ................. A61N 1/3787
310/314
2016/0124215 A1* 5/2016 Freedman .............. H02K 33/18
29/598

* cited by examiner (I)

(II)

(III)

MAGNETIC DRIVE THAT USES AN EXTERNAL MAGNETIC FIELD

TECHNICAL FIELD

The description relates to a magnetic drive that is configured to interact with and move within an external magnetic field. Particularly, the description relates to a magnetic drive that is configured to transform a rotational movement into a translational movement within the external magnetic field.

TECHNICAL BACKGROUND

Typically, electromagnetic components are used to generate a force and/or a motion within a magnetic field. Depending on the signal pattern electric current is provided to the electromagnetic component, a respective force is generated as a result of the interaction of a magnetic field generated by the electromagnetic component and the surrounding magnetic field.

For example, electric motors are built based on this principle. Electric motors typically comprise a rotor and a stator, one of which typically comprises one or more permanent magnets and the other comprises one or more coils that are provided with electric current in accordance with a signal pattern so that the rotor rotates with respect to the stator.

BRIEF SUMMARY

There may exist a need for an alternative drive that has less wear and tear and reduced number of distinct movable parts.

According to an aspect, a magnetic drive that is configured to interact with an external magnetic field comprises a base plate, an energy source, a control unit, a first magnetic field generator, and a switching circuit. The energy source and the first magnetic field generator are interconnected by the switching circuit. The control unit is configured to control the switching circuit to provide energy to the first magnetic field generator. The first magnetic field generator is configured to generate a magnetic field when being supplied with energy. The control unit is configured to control the switching unit to achieve a desired polarity of the generated magnetic field to interact with the external magnetic field so that a rotational force is generated to rotate the first magnetic field generator within the external magnetic field.

The external magnetic field may be a naturally generated magnetic field like the earth's magnetic field. Thus, there is no need for a distinct stator for the magnetic drive described herein. The energy source, control unit, first magnetic field generator, and switching circuit are all attached and connected to the base plate, so that all components of the magnetic drive built a single structural unit. When the first magnetic field generator is supplied with electrical energy, it generates a force so that the base plate and with it all other components are subject to a movement force within the external magnetic field. In other words, the entire magnetic drive moves as a result of a force generated by interaction of the magnetic field of the first magnetic field generator and the external magnetic field.

This magnetic drive may be attached to a vehicle or any other structural system to be moved by the force generated by the magnetic drive.

The amount of energy that is conducted to the magnetic field generator can be controlled by switching on and off the energy supply from the energy source to the magnetic field generator. I may also be controlled how much electric energy is run through the magnetic field generator. This may be done by using linear regulators. However, it may also be done by using pulse width modulation, PWM. The integration capability of a coil that is used as the magnetic field generator is converting the PWM signal into an almost analog signal.

According to an embodiment, the control unit is configured to selectively change a connection scheme of the switching circuit and to control a polarity of the generated magnetic field depending on a relative orientation of the magnetic field generator with respect to the magnetic field lines of the external magnetic field, thus achieving that the poles of the generated magnetic field are attracted or repelled by the poles of the external magnetic field and a force is exerted onto the magnetic field generator.

The force which acts onto the first magnetic field generator depends on the orientation of the first magnetic field generator and its magnetic field with respect to the magnetic field lines of the external magnetic field. When changing the polarity of the electric energy supplied to the first magnetic field generator, the direction of the force and the movement also changes.

According to a further embodiment, an intensity of the generated magnetic field is between 0.1 and 10.0, preferably between 0.5 and 2.0 of an intensity of the external magnetic field. Preferably, the intensity of the generated magnetic field is between 0.05 and 0.5 Milli-Tesla, mT, more preferably between 0.1 and 0.2 mT.

According to a further embodiment, the external magnetic field is the earth's magnetic field.

Thus, the magnetic drive described herein is able to generate a movement force by interaction with the earth's magnetic field (EMF) and can translate a rotational movement within the EMF into a translational movement of the magnetic drive.

According to a further embodiment, the magnetic field generator is a coil, wherein the coil has between 10 and 1000 windings, preferably between 50 and 1000 windings.

The coil may have a ferro-magnetic core. Alternatively, the coil may be an air coil.

According to a further embodiment, the first magnetic field generator is supplied with electric energy when an angle of a central axis of the first magnetic field generator with respect to field lines of the external magnetic field is larger than 5° and smaller than 175°, preferably larger than 10° and smaller than 170°, more preferably larger than 15° and smaller than 165°, even more preferably larger than 20° and smaller than 160°, even more preferably larger than 25° and smaller than 155°, even more preferably larger than 30° and smaller than 150°, wherein the first magnetic field generator is not supplied with electric energy when the angle of the central axis of the first magnetic field generator with respect to the field lines of the external magnetic field is out of said angle value ranges.

The central axis referred to in this embodiment is a longitudinal axis of the coil of the first magnetic field generator, wherein the axis defines a center of the windings of the coil. In other words, the windings of the coil are arranged coaxially with respect to the axis of the first magnetic field generator. When providing the first magnetic field generator with electrical energy under the conditions in regards of the orientation of the longitudinal axis with respect to the magnetic field lines of the external magnetic field, the resulting force is efficiently generated.

According to a further embodiment, the magnetic drive further comprises a second magnetic field generator, wherein the second magnetic field generator is preferably designed similar to the first magnetic field generator as described herein, wherein the second magnetic field generator is mounted to the base plate and spaced apart from the first magnetic field generator.

This embodiment may provide an increase movement force due to the fact that it uses two magnetic field generators that are spaced apart from each other and arranged at different positions at the base plate. Preferable, the first and second magnetic field generators are positioned symmetrically with respect to a center point of the base plate, for example at different ends of a base plate with an elongate shape or at same distance to a respective end of the base plate.

According to a further embodiment, the first and second magnetic field generators are arranged so that their central axes are coaxial and coincide.

For example, the first and second magnetic field generators are air coils with the base plate extending through the central opening of the air coils and each magnetic field generator is arranged at or close to an end of the base plate. In other words, the central axes of the first and second magnetic field generators are a common axis of both said magnetic field generators.

According to a further embodiment, the magnetic drive further comprises a third and fourth magnetic field generator whose central axes preferably coincide and are coaxial. The central axes of the third and fourth magnetic field generators are a common axis of both said magnetic field generators. Preferably, the central axis of the third magnetic field generator intersects a central axis of the first magnetic field generator at an angle between 70° and 110°. Preferably, the central axis of the third magnetic field generator is orthogonal with respect to the central axis of the first magnetic field generator.

For example, the four magnetic field generators are arranged with respect to each other like the end points of a cross. With this design, more options to reliable create a movement force within an external magnetic field exist.

According to a further embodiment, the control unit is configured to supply the first and second magnetic field generators with electric current so that the north-poles of the first and second magnetic field generators point in the same direction, wherein the control unit is configured to change the polarity of the electric energy supplied to the first and second magnetic field generators once the first and second magnetic field generators pass the north and south-pole of the external magnetic field.

In other words, the base plate with the first and second magnetic field generators works similar as an electromagnetic compass needle with the additional feature that the polarity of this "electromagnetic compass needle" can be changed so that its rotational movement can be either clockwise or counterclockwise, depending on the polarity of the electric current and the initial position and orientation of the base plate with respect to the external magnetic field. However, it is noted that the first and second magnetic field generators are not necessarily supplied with electric current at the same time. The magnetic field generators are preferably powered with energy in an alternating sequence.

According to a further embodiment, the control unit is configured to supply the first and second magnetic field generators with electric current in an alternating manner, preferably supply electric energy to exclusively one magnetic field generator at a time, and so that the north-poles of the first and second magnetic field generators point in opposite directions.

According to a further embodiment, the control unit is configured to maintain the polarity of the electric energy supplied to at least one of the first and second magnetic field generators as long as a first moving direction of the base plate with respect to the external magnetic field remains the same, wherein the control unit is configured to change the polarity of the electric energy supplied to the at least one of the first and second magnetic field generators to generate a force that acts on the base plate with respect to the external magnetic field in a direction opposite to the first moving direction.

These and other embodiments will be described in greater detail with reference to the following drawings. The drawings are schematic and not to scale.

DETAILED DESCRIPTION OF EMBODIMENTS

Figure 1:
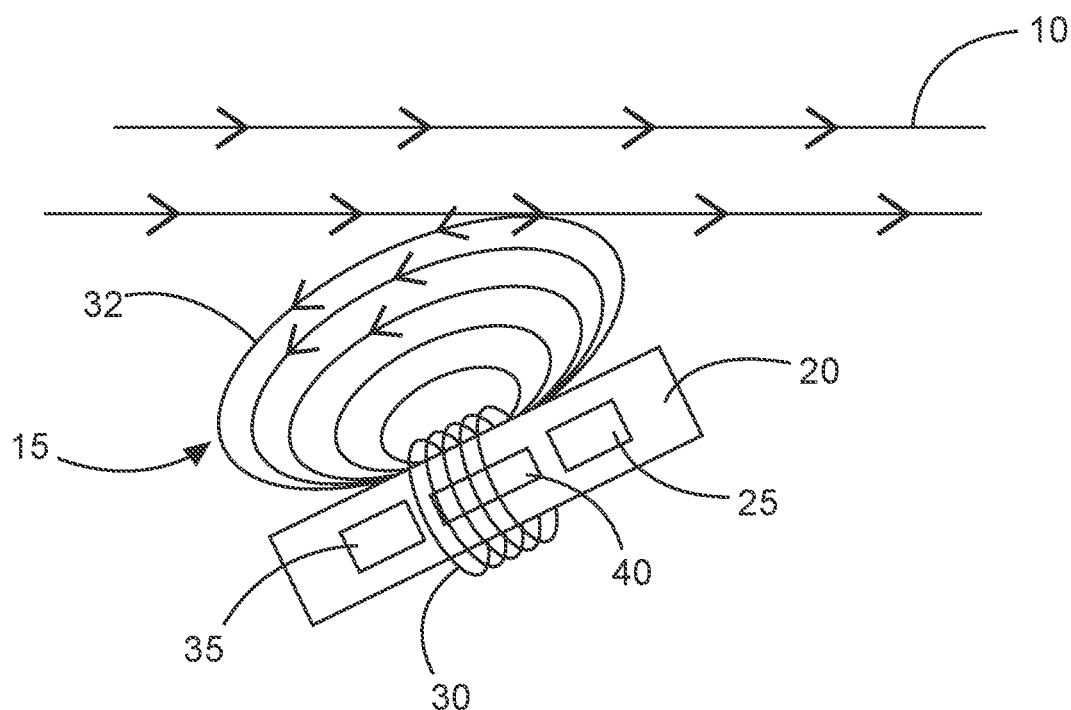
FIG. 1 describes the interaction between the magnetic field generated by a magnetic field generator and an external magnetic field.

FIG. 1 describes an external magnetic field 10, like the earth's magnetic field, EMF, with its directional magnetic field lines. A magnetic drive 15 is arranged within this external magnetic field 10. The magnetic drive 15 comprises a base plate 20, a magnetic field generator 30 (for example, a coil), an energy source 25 (preferably a battery or any other source of electric energy), a controller 35, and a switching unit 40. The switching unit 40 may comprise semiconductor switches. The switching unit 40 is connected to the energy source 25 and to the magnetic field generator 30. The controller 35 controls the status of the switching unit 40. For example, the controller 35 controls the switching unit so that the electric energy provided by the energy source 25 is provided to ports of the magnetic field generator 30 so that the magnetic field generator generates a magnetic field 32. The magnetic field 32 interacts with the external magnetic field 10 so that a force is exerted on the magnetic field generator 30. This force is a rotational force, i.e., the magnetic field generator 30 rotates with respect to the external magnetic field 10. As a result, the magnetic field generator rotates until the magnetic field lines of the field 32 and of the field 10 are aligned. The magnetic field generator 30 is mechanically coupled with the base plate 20 and the remaining components of the magnetic drive 15, so that the movement of the magnetic field generator 30 causes the entire magnetic drive 15 to move.

The switching circuit 40 may comprise multiple semiconductor switches which can be in an open or closed state. In the open state, the switches are electrically non-conductive while they are electrically conductive in the closed state. The switching circuit may comprise multiple switches so that electric energy can be provided to the magnetic field generator in a desired polarity so that the magnetic field also has an according direction or polarity (north/south-pole).

The magnetic field generator 30 typically has two ports. The polarity of the generated magnetic field 32 depends on which of these poles are provided with which electric pole of the energy source 25. The switching circuit is designed accordingly so that any electric pole of the energy source can be selectively guided to any of the two ports of the magnetic field generator 30.

The magnetic field 32 is anchored to the magnetic field generator 30. When the external magnetic field exerts a force onto the field 32, this force is also exerted onto the magnetic field generator 30. For example, a rotational force is exerted so that the magnetic field generator 30 rotates within the external magnetic field 10.

Figure 2:
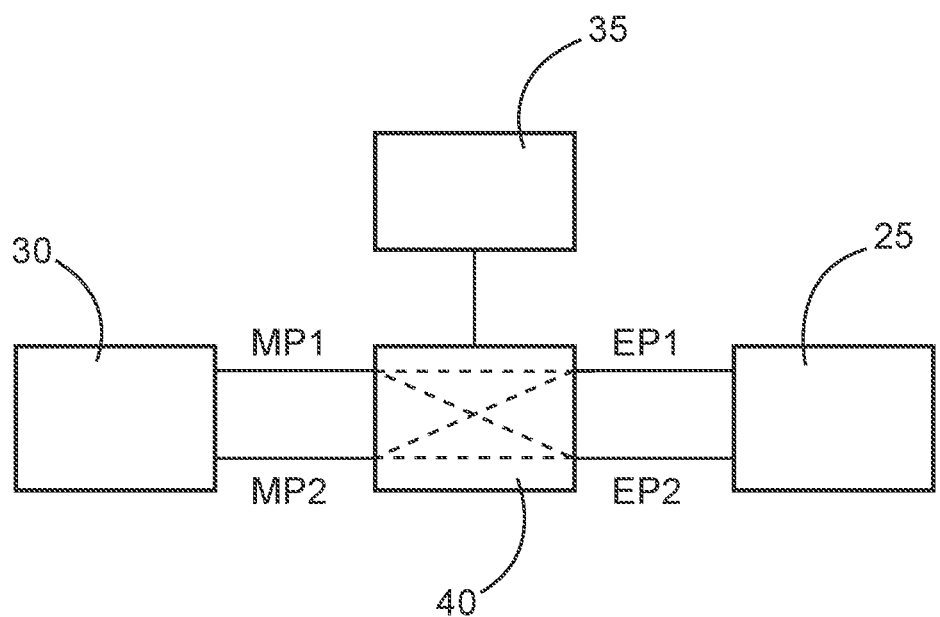
FIG. 2 schematically shows a magnetic drive and its components.

FIG. 2 shows the connecting scheme of the magnetic drive components: the switching circuit 40 is arranged so that is interconnects the energy source 25 and the magnetic field generator 30. The controller 35 is connect to the switching circuit 40 and controls the state of the switches. Now, the controller 35 may control the switching circuit so that the pole EP1 of the energy source is selectively connected to either of MP1 or MP2 of the magnetic field generator 30. The other pole EP2 of the energy source is connected to the other one of the poles of the magnetic field generator 30. In other words, the following connection schemes are possible: (I) EP1 to MP1 and EP2 to MP2; (II) EP1 to MP2 and EP2 to MP1. These two connection schemes directly affect the direction of the magnetic field lines of the generated magnetic field 32.

Figure 3:
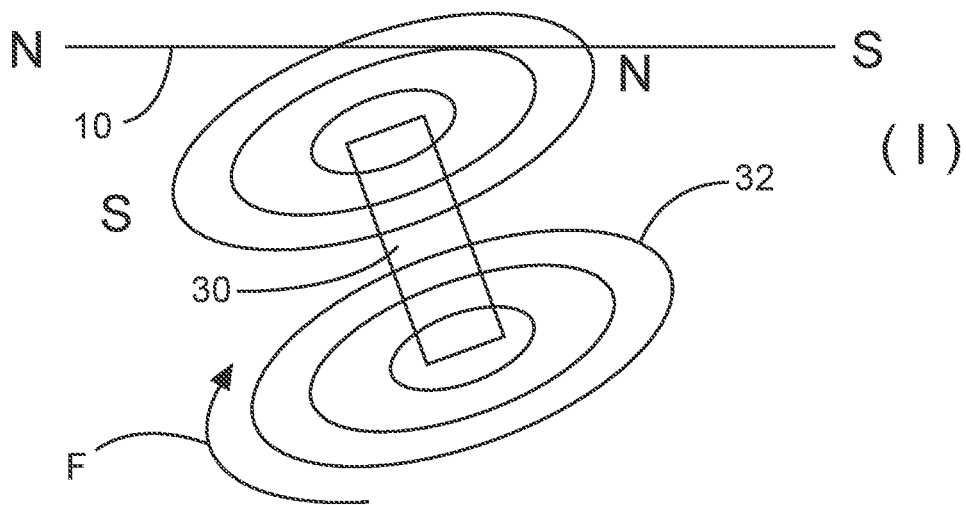
FIG. 3 schematically shows forces generated by a magnetic field generator located in an external magnetic field.
Figure 3:
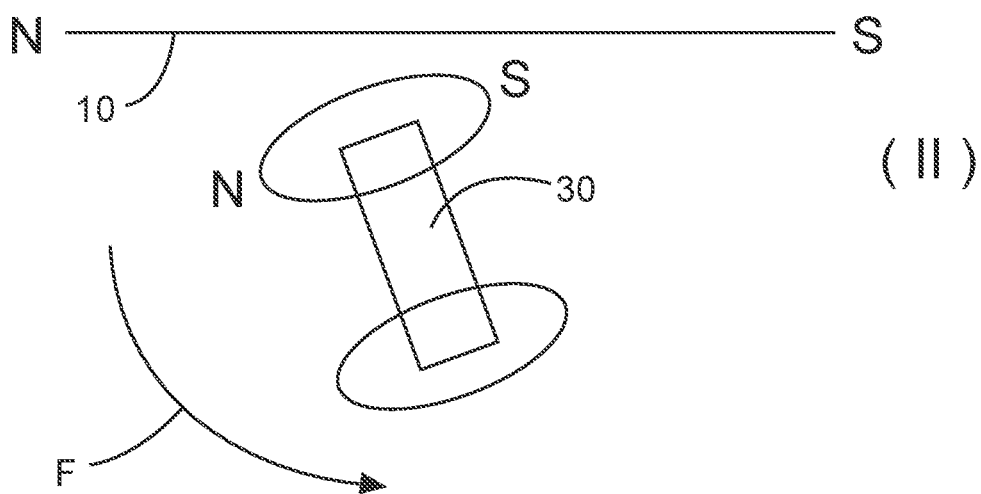
Figure 3:
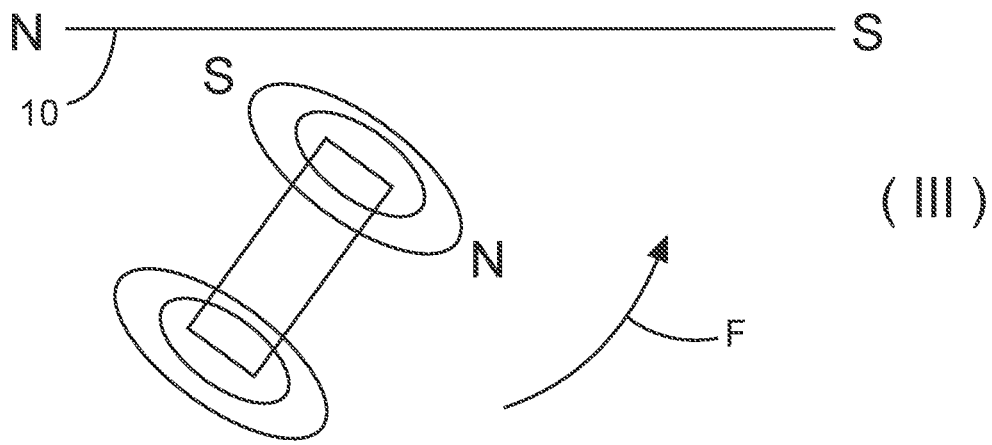

FIG. 3 shows different effects caused by the external magnetic field 10 onto the magnetic field generator 30 depending on the polarity of the magnetic field 32 generated by the magnetic field generator 30. For the sake of simplicity, only one magnetic field line of external magnetic field 10 is shown. Of course, the field 10 consists of multiple lines, i.e., it is a field.

In scenario (I), a rotational force F in the clockwise direction is generated since the north-pole of field 10 attracts the south-pole of field 32.

When changing the polarity of the energy supplied to the magnetic field generator 30 (by changing the status or the switching scheme of the switching circuit 40 as described with respect to FIG. 2), the poles of the magnetic field generator 30 are interchanged, i.e., the south-pole is on the right and the north-pole is on the left of the field 32, as shown in scenario (II) of FIG. 3. The consequence of such a change of polarity is that a rotational force F in the opposite direction is generated, i.e., counterclockwise. The south-pole (on the right) of field 32 is attracted by the north-pole of field 10 and the north-pole (on the left) of field 32 is attracted by the south-pole of field 10.

As will be appreciated, the direction of the rotational force depends on the orientation of the magnetic field generator 30 and the magnetic field 32 with respect to the external magnetic field 10. In scenario (III), the south-pole of the field 32 points towards the left (towards north-pole of field 10) and the north-pole of field 32 points towards the right (towards south-pole of field 10). Based on this relative orientation of the fields 10, 32, a counterclockwise force F is generated.

The orientation of the magnetic field generator 30 and the polarity of the generated magnetic field 32 as well as the direction of the magnetic field lines of the external magnetic field define the direction of the rotational force exerted to the magnetic field 32 of the magnetic field generator 30.

Figure 4:
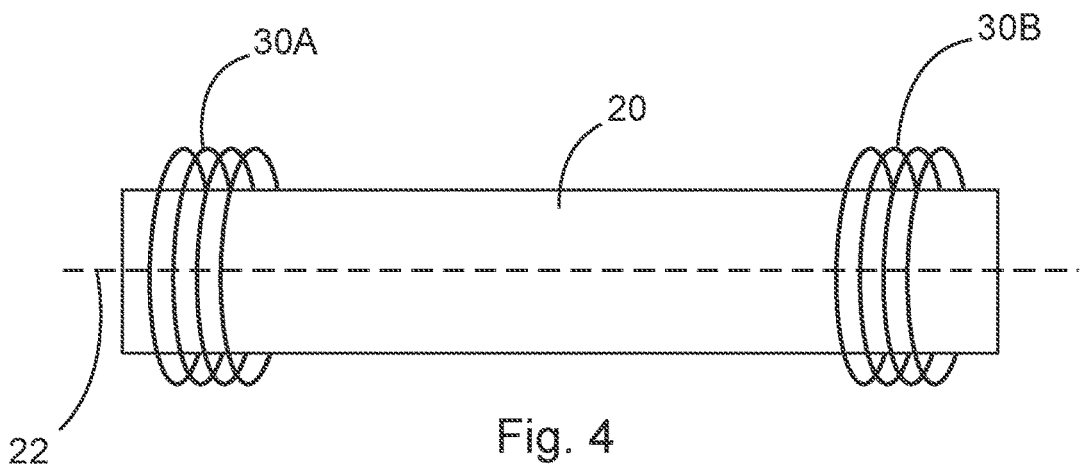
FIG. 4 schematically shows a base plate and two magnetic field generators.

FIG. 4 describes a magnetic drive 15 with a base plate 20 and two magnetic field generators 30A, 30B. The first magnetic field generator 30A is mounted to the base plate in the proximity or at a first end of the base plate. The second magnetic field generator 30B is mounted in the proximity or at a second end (opposite to the first end) of the base plate 20. In other words, the first and second magnetic field generators 30A, 30B are spaced apart from each other along a longitudinal axis 22 of the base plate. The energy source, control unit and switching circuit are not shown in FIG. 4. The base plate 20 may be a printed circuit board that functionally interconnects the components as shown, for example, in FIG. 2. However, the base plate may be any kind of mechanical support or frame and the interconnections between the components (compare FIG. 2) may be done by an additional circuit board.

The embodiment shown in FIG. 4 comprises two magnetic field generators 30A, 30B. Each of these magnetic field generators works as basically described with reference to FIGS. 1 to 3. However, since the magnetic field generators 30A, 30B are mounted to the base plate, the rotational force provided by each of the magnetic field generators can be transitioned into a linear or translational force resulting in a linear (or translational and almost linear) movement of the base plate. The principles are described with reference to FIG. 5.

A central axis of the first and second magnetic field generators 30A, 30B runs parallel to the longitudinal axis 22 of the base plate. Generally, the central axis of a coil is orthogonal to the plane of the coil, i.e., to the plane that is spanned by the windings of the coil.

Figure 5:
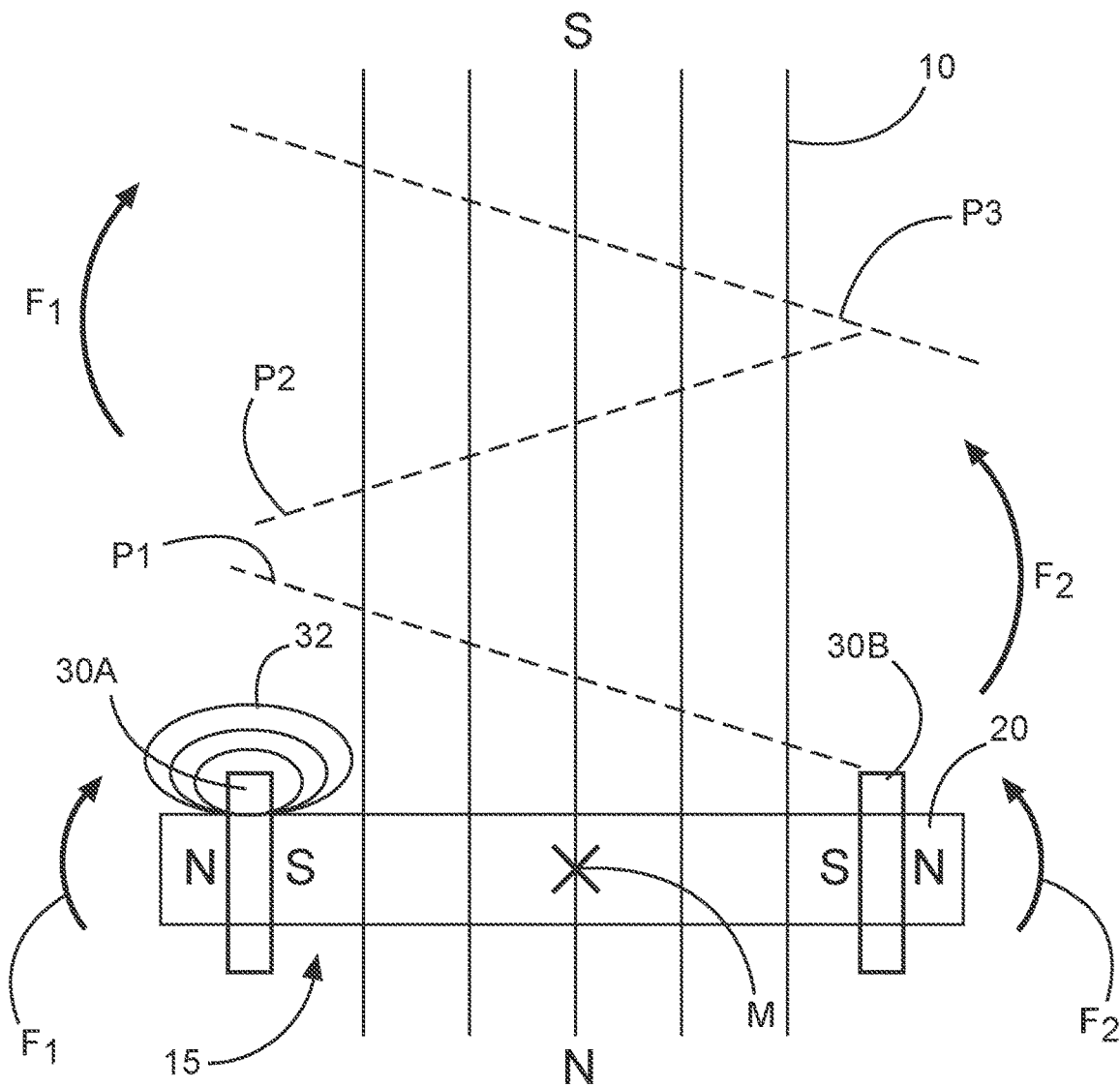
FIG. 5 schematically shows a motion pattern of a magnetic drive with respect to an external magnetic field.

FIG. 5 shows a magnetic drive 15 as shown in FIG. 4 positioned within an external magnetic field 10 of which the field lines are oriented in a vertical direction.

Basically, each one of the magnetic field generators 30A, 30B exerts a rotational force. However, as a result of controlling the magnetic field generators in a certain manner, this rotational force results in a translational and/or almost linear movement of the base plate with respect to the external magnetic field 10.

In a first step, one of the magnetic field generators 30A, 30B, say the first magnetic field generator 30A, is supplied with electric energy. As a result of the polarity of the magnetic field 32 of the first magnetic field generator 30A, the north-pole (on the left of magnetic field generator 30A) rotates towards the south pole of magnetic field 10. This rotational force will rotate the entire base plate in a clockwise direction (CW, F1). This will bring the base plate in a position similar to position P1. Once in this position, the second magnetic field generator 30B is supplied with electric energy so that the polarity of the second magnetic field generator 30B is inverted compared to the polarity of the magnetic field of the first magnetic field generator 30A. In other words, the north-pole of the magnetic field of the second magnetic field generator 30B is on the right. This polarity will cause the right end of the base plate to move towards the south-pole of field 10 and will finally bring the base plate into position P2. The base plate rotates in a counterclockwise direction (CCW, F2). In a third step, the first magnetic field generator 30A is again supplied with energy with the same polarity as in the first step and will rotate the base plate in a clockwise direction to bring the base plate from position P2 to position P3, finally resulting in a translational or linear movement of the base plate within the field 10 and as a result of rotational movements of the individual magnetic field generators 30A, 30B within the external magnetic field 10.

The main direction of the translational or linear movement can be in either direction, i.e., towards the south-pole or towards the north-pole of field 10 and even inclined at certain angle values with respect to the direction of the field lines of the magnetic field 10.

Furthermore, the direction of movement of base plate 15 can be changed as a result of the duration and/or intensity of the energy supply to the first and second magnetic field generators. When the first magnetic field generator 30A is supplied with electric energy a longer time than the second magnetic field generator 30B, the base plate as a whole does a clockwise rotation. The base plate 15 can be moved back and forth within the field 10 by changing the polarity of the magnetic field generated by the first and second magnetic field generators 30A, 30B.

The magnetic drive can be used with a base plate that is supported in the air, i.e., like a pendulum. However, the magnetic drive can also be used when resting on a surface. For example, wheels may be mounted to the downside of the base plate. When the first magnetic field generator 30A is supplied with electric energy as shown in FIG. 5, the left wheel of the base plate moves towards the south-pole of field 10. Upon a certain degree of movement, the first magnetic field generator 30A is not supplied with electric energy anymore (in position P1). In this position, the wheel underneath the left end of the base plate may be blocked to hold the position of the left end of the base plate. Then the second magnetic field generator 30B is supplied with electric energy to move the right end of the base plate forwards, i.e., towards the south-pole of field 10. The process of moving forward one end of the base plate (clockwise, counterclockwise, in a repeating manner) and blocking the wheel at that end which just moved forward is repeatedly carried out.

The base plate has a geometric center M. However, when one of the magnetic field generators 30A, 30B is supplied with energy, the base plate does not necessarily rotate about this center M. For example, when the magnetic field generator 30A generates its magnetic field, the center of rotation is rather offset towards the other magnetic field generator 30B so that the base plate is brought to position P1. The same applies when the second magnetic field generator 30B is supplied with electric energy. The center of rotation is then offset towards the first magnetic field generator 30A to move the base plate from position P1 to position P2. This altered center of rotation can be easily achieved when the magnetic drive is used within a device that rests on wheels upon a surface. One of the wheels is blocked or otherwise brought to a static state while the magnetic field generator at the other end or side of the base plate rotates with respect to the magnetic field 10. In such a case, when transitioning from position P1 to position P2, the center of rotation is the blocked wheel underneath the base plate at the left end.

Figure 6:
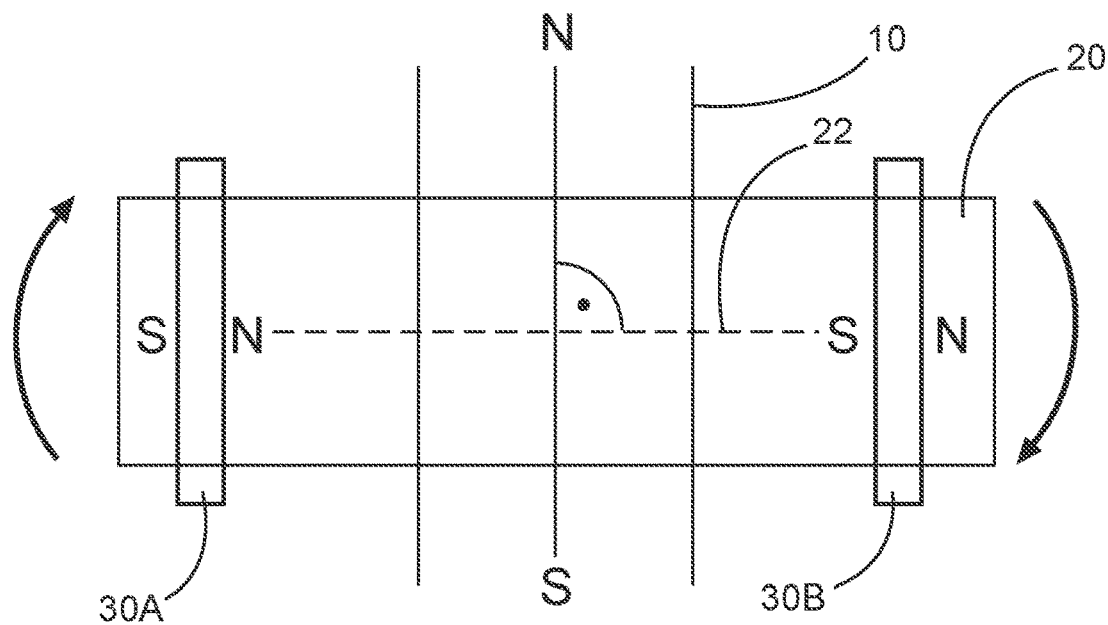
FIG. 6 schematically shows a magnetic drive and possible forces that result from interacting with an external magnetic field.

FIG. 6 shows a configuration for rotating the base plate 20 within the external magnetic field 10. The first and second magnetic field generators 30A, 30B are supplied with electric energy so that the north-poles of both magnetic field generators 30A, 30B point towards the right side of the drawing. In this scenario, the south pole of generator 30A is attracted by the north-pole of field 10 and the north-pole of generator 30B is attracted by the south-pole of field 10. This results in a clockwise rotation of the base plate 20. It is noted that the magnetic drive shown in FIG. 6 can be driven with electrical current so that it rotates either in clockwise or counterclockwise direction, depending on the polarity of the electric current, because both magnetic field generators act in the same direction (clockwise or counterclockwise) since the magnetic poles point in the same direction, i.e., south to the left and north to the right in this example.

Assuming that there is an angle of 90° between the longitudinal axis 22 of the base plate and the field lines of magnetic field 10: once the base plate has rotated more than 90° in the clockwise direction, the south-pole of generator 30A has passed the south-pole of field 10 and the north-pole of generator 30B has passed the north-pole of field 10, the polarity of the magnetic fields generated by the first and second magnetic field generators 30A, 30B is changed. Thus, the north-pole of generator 30A is repelled by the north-pole of field 10 and the south-pole of generator 30B is repelled by the south-pole of field 10 and the base plate goes on rotating in the clockwise direction. The polarity of the magnetic fields generated by the first and second magnetic field generators is changed every time the base plate 20 performs a half rotation, i.e., 180°. Particularly, the electric energy supply to the magnetic field generators 30A, 30B is stopped when the magnetic field generators approach the poles of the external magnetic field 10, for example at an angle of 10° to 30° between the longitudinal axis 22 and the field lines of field 10. Electric energy with inversed polarity is then supplied to the magnetic field generators once the base plate has passed the orientation in which the longitudinal axis 22 is parallel to the direction of field lines of field 10.

Of course, the direction of rotation can be changed when the polarity of both magnetic field generators 30A, 30B is changed to the state shown in FIG. 5.

FIG. 6 shows a configuration for rotational movement of the base plate 20. FIG. 5 shows a configuration for translational or linear (or almost linear) movement of base plate 20 within magnetic field 10. To achieve the translational movement of FIG. 5, the polarity of the magnetic fields generated by the first and second magnetic field generators 30A, 30B is opposite to one another. In FIG. 5, the north-pole of generator 30A is on the left and the north-pole of generator 30B is on the right. This applies for a moving direction towards the south-pole of the external magnetic field. For the opposite direction, the polarity of both generated magnetic fields is changed. For translational movement, the generators 30A, 30B are supplied with electric energy in an alternating manner or so that the polarity of the fields generated by the magnetic field generators 30A, 30B is opposite to one another.

The magnetic drive may comprise magnetic field sensors to detect the direction of the field lines of the external magnetic field 10. Furthermore, the magnetic drive may comprise acceleration sensors to detect the movement of the base plate. Based on the detected movement or acceleration of the base plate, the magnetic field generators are supplied with electric energy.

With reference to FIGS. 4 to 6 and further reference to FIG. 2, the working mode of the controller 35 is described. The controller 35 generates a signal pattern for connecting through the coil-power-driver circuits (e.g., full H-bridge power amplifiers) that are part of the energy source 25 to the coils. This signal pattern will cause the magnetic drive to perform a motion that will result in a swinging-like movement when the magnetic drive is freely suspended in the air or a translational movement on a solid surface or water. As long as this special signal pattern is generated by the controller 35, the magnetic drive will keep moving around (e.g., swinging rhythmically like a pendulum, following a predetermined pattern). When disconnecting the energy source (e.g., a rechargeable battery power source), the rhythmic swinging will gradually become less and less until the magnetic drive is hanging on the suspension motionless.

The diver signals generated by the controller will created an electric current that is running through one or through both air-coils. By doing so, the air-coils will generate a magnetic field similar in strength as the EMF (Earth Magnetic Field), 1 to 2 Gauss (0.1 to 0.2 mT). These magnetic fields (generated by the two air-coils) will interact with the EMF and create a twist-like force onto the coil and the base plate. For example, the magnetic drive has the ability to turn around horizontally in either direction (clockwise and counterclockwise), just as a compass-needle will do when exposed to the EMF.

For example, in order to not just achieve a rotational movement of the magnetic drive but a translational back-and-forth movement (that may be overlaid by some rotational twist movements), the magnetic drive's own inertia momentum is used. By powering up only one air coil at the time (at the right moment for the correct length of time) the magnetic drive will do both: rotate and swing, i.e., a translational movement.

The controller may receive commands from an external control unit (not shown) via a wireless interface like BluetTooth, WiFi, or the like.

Figure 7:
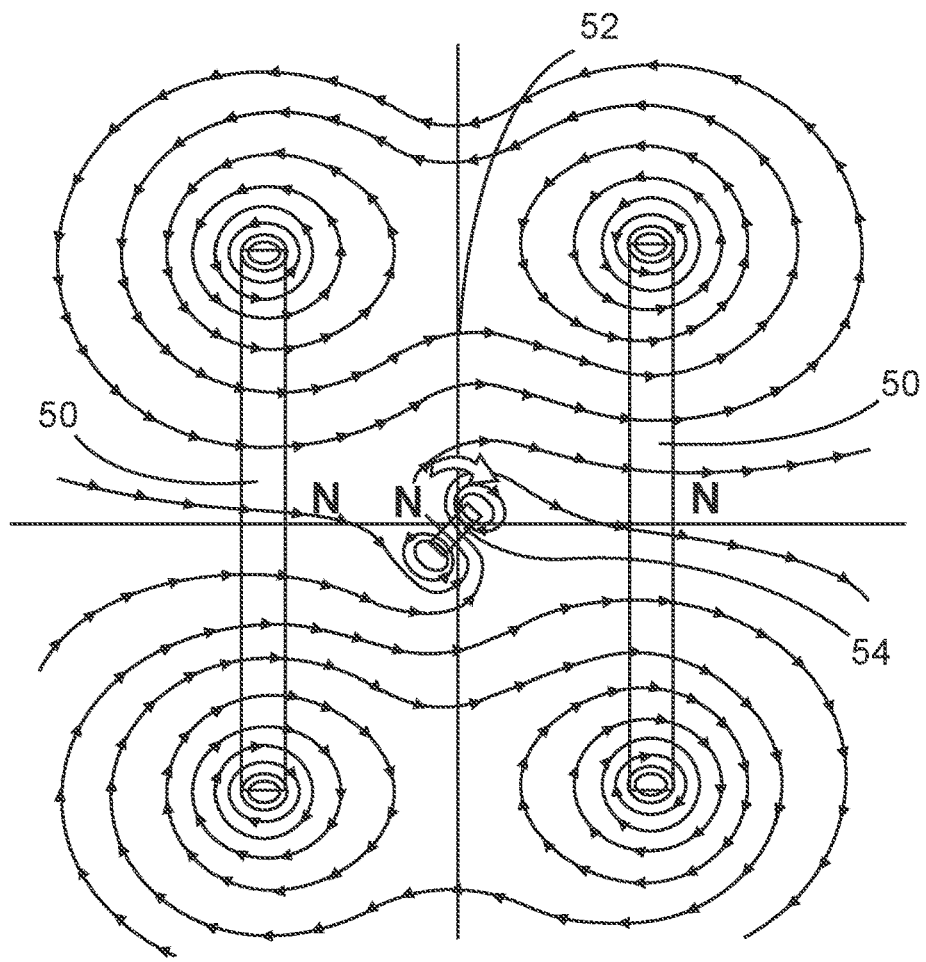
FIG. 7 schematically shows magnetic field lines when an air coil is placed within a Helmholtz generator.

FIG. 7 shows a field simulation and demonstrates created rotational forces of a magnet that is located in an external magnetic field like the EMF. As the EMF can be considered to be uniform it may be difficult to create a linear motion force with a direct (or a straight forward) approach. However, it is possible to use the EMF to create a twisting (rotational) motion force, like the rotational movements of a compass needle. An easy way to visualize this effect is when observing the force that acts on a compass needle: The uniform EMF is acting on the magnetic field created by the compass needle and will align (turn) the compass needle to run in parallel with the EMF.

FIG. 7 shows two larger air coils 50 (placed at the left and right side in this drawing) that are acting as a Helmholtz generator. FIG. 7 shows the effect caused by a uniform-magnetic field 52 (like from the EMF) onto a small magnetic field, generated by a much smaller air coil 54 that is placed in the center of the two Helmholtz air coils 50.

Within the "parallel" and uniform magnetic field 52 (that simulates the EMF) the small magnetic field generator (electric powered air coil 54) is placed with an angle of 45 degrees in relation to the field 52. The field 52 is interacting with the field generated by the small air coil 54 and is creating a turning or twisting force on the smaller field generator 54. This force will try to straighten-out the position of the small field generator 54 (in this example a twist force in clockwise direction).

Figure 8:
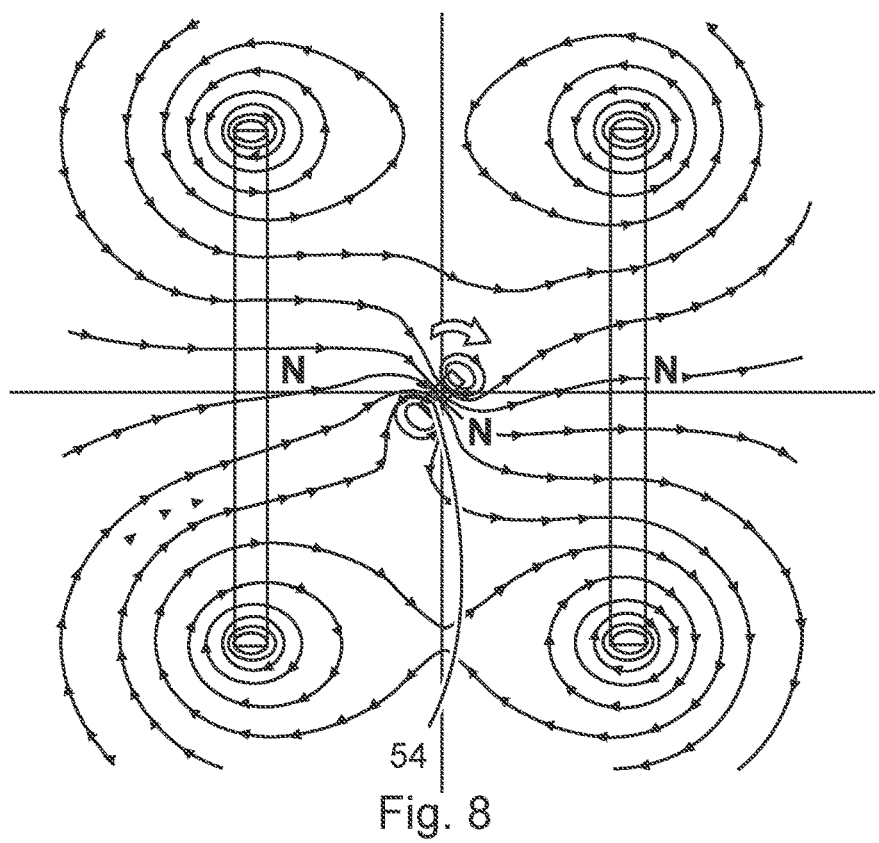
FIG. 8 schematically shows magnetic field lines when an air coil is placed within a Helmholtz generator.

FIG. 8 shows a similar configuration as is shown in FIG. 7. However, in FIG. 8, the air coil 54 is powered with different polarity so that the north and south pole of the magnetic field of the air coil 54 change. The electric current flowing through coil 54 has been reversed. The twist force will now act on the coil 54 in the counterclockwise direction.

Figure 9:
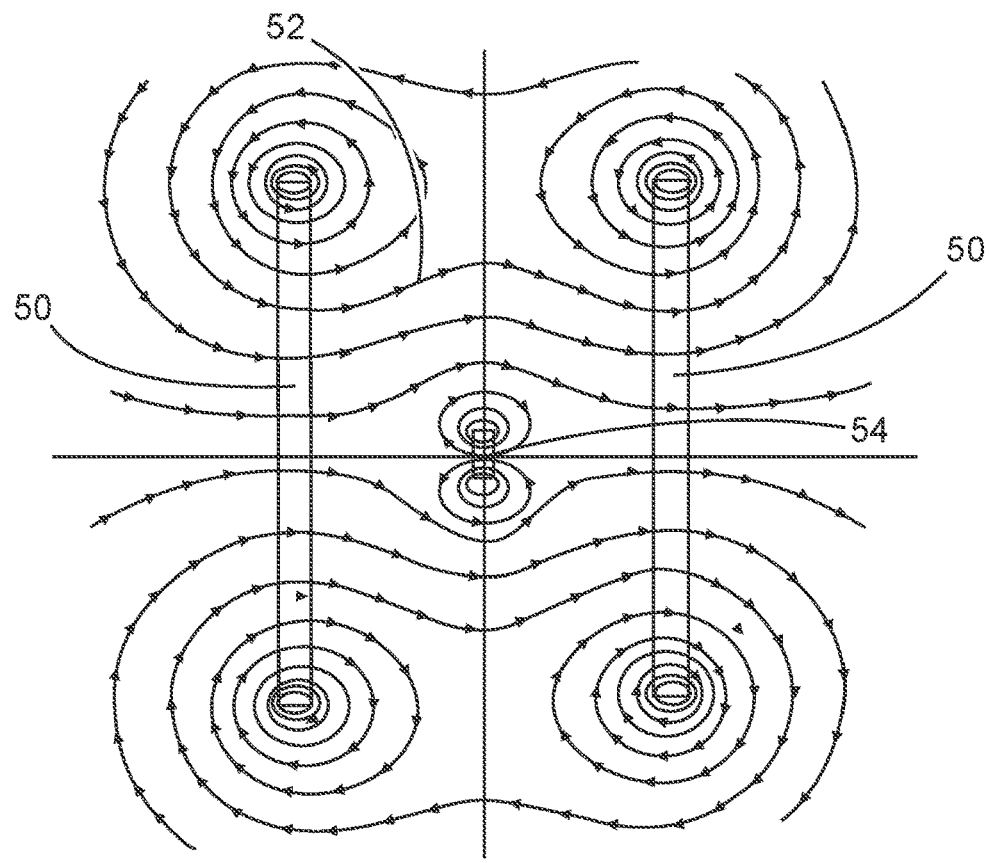
FIG. 9 schematically shows magnetic field lines when an air coil is placed within a Helmholtz generator.

FIG. 9 shows a configuration in which the magnetic field lines of the field 52 generated by the coils 50 and the field generated by the coil 54 are aligned. When the magnetic polarities (the created magnetic field lines of coil 54) are aligned with the uniform magnetic field lines 52 (created by the Helmholtz coils 50 or by the EMF), then the mechanical forces that acted before on the coil 54 are neutralized. In this case there will be no movement whatsoever of the electrically powered inductor.

Figure 10:
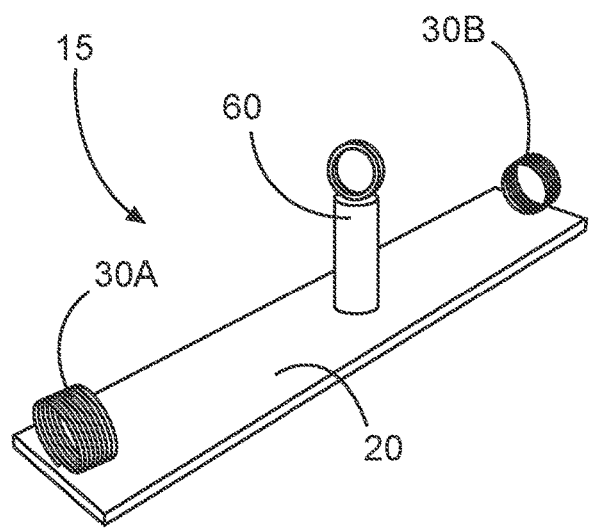
FIG. 10 schematically shows a design option of a magnetic drive.
Figure 11:
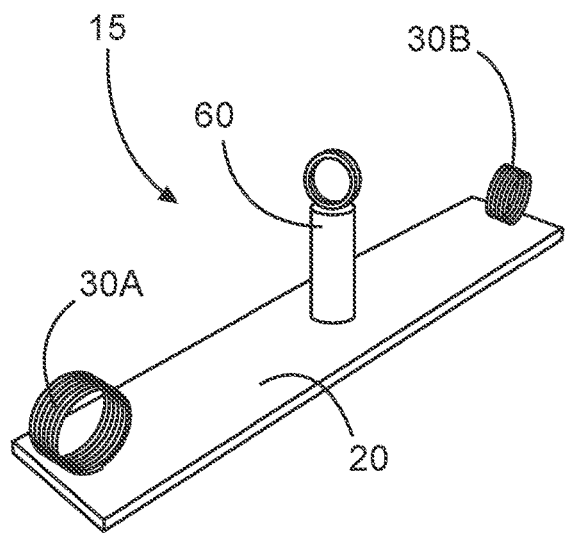
FIG. 11 schematically shows a design option of a magnetic drive.

FIGS. 10 and 11 show to design principles of a magnetic drive 15 with a base plate 20, two magnetic field generators 30A, 30B coupled with the base plate 20, and a suspension 60. The suspension is configured to be attached to a device to be moved by the magnetic drive 15. However, the suspension may also be used to attach the magnetic drive to a thread so that the magnetic drive acts as a pendulum driven by the interaction of the magnetic fields generated by the magnetic field generators 30A, 30B and the EMF.

One or more electric powered magnetic field generator/s 30A, 30B will be placed at the outer edge of a base plate 20, e.g. a carrier like a printed circuit board, PCB. A suspension 60 is arranged in the center of the base plate.

FIGS. 10 and 11 show a magnetic drive 15 with two air cools 30A, 30B placed at the outer ends of an elongated base plate. The suspension 60 is arranged in the center of the base plate facing upwards. The twisting torque forces created by this design may change (e.g., will be larger or smaller) depending at which angle the base plate is aligned with the external magnetic field like the EMF. Depending in which direction the coil orientation is (in relation to the base plate), the alignment to the EMF field will be different by 90 degrees.

In FIG. 10, the coils 30A, 30B face each other and they have a common central axis that is parallel to the longitudinal axis of the base plate. In FIG. 11, the coils 30A, 30B are twisted by 90 degrees compared to their orientation in FIG. 10.

Figure 12:
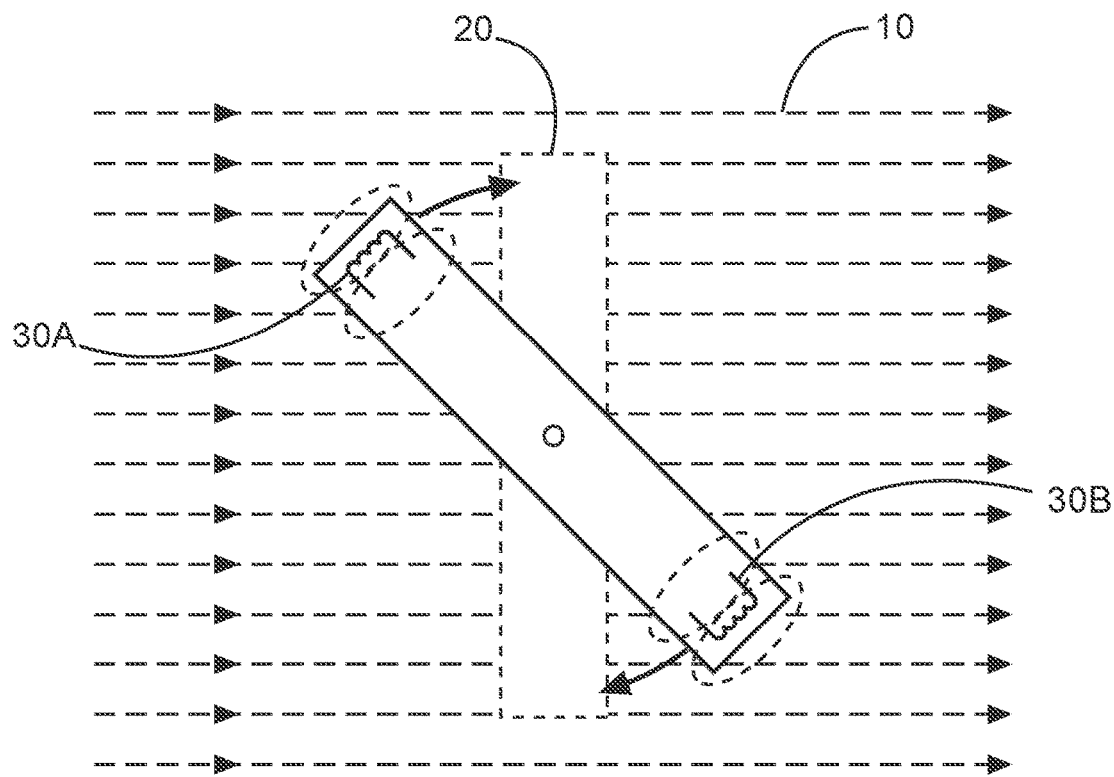
FIG. 12 schematically shows movement of a magnetic drive within an external magnetic field.

FIG. 12 shows the interaction of a magnetic drive with the EMF 10. The magnetic field generated by the two inductor coils 30A, 30B will create a force when immersed in a uniform magnetic field 10 like the EMF. This force will act to align the inductor coils 30A, 30B with the magnetic field 10, as indicated by the arrows in clockwise direction.

Figure 13:
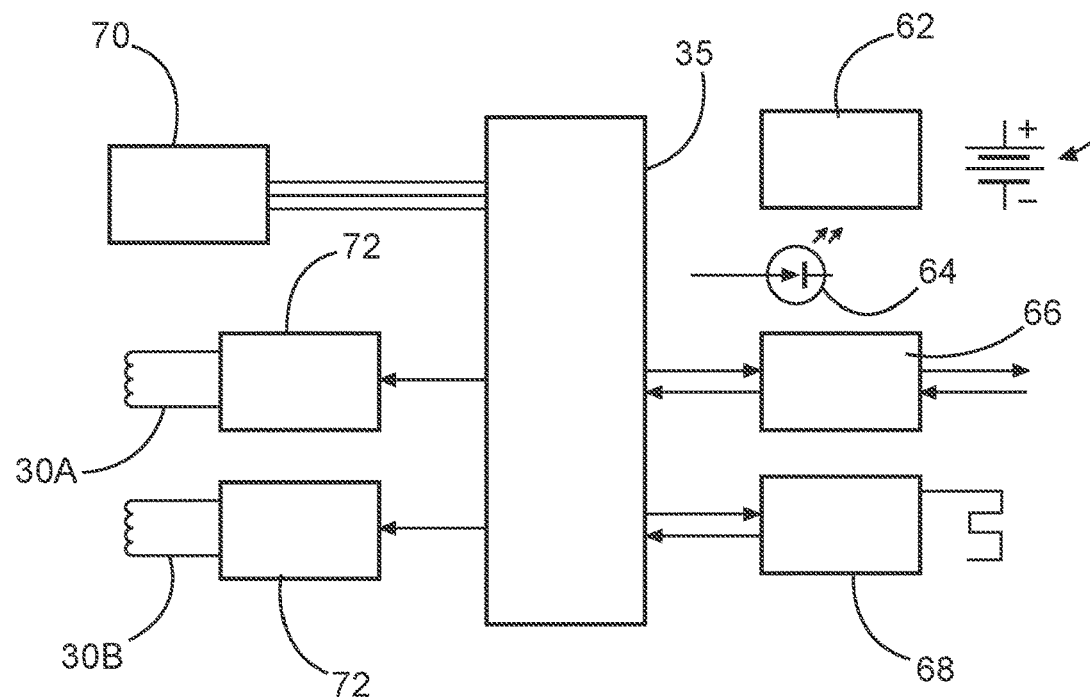
FIG. 13 schematically shows an overview of the functional components of a controller of a magnetic drive.

FIG. 13 shows a schematic representation of some of the functional components of the magnetic drive 15. The controller 35 comprises a serial interface 66 and a wireless interface 68. The serial interface 66 may be used to program the controller 35 prior to operating the magnetic drive. The wireless interface 68 may be used to transmit commands during operation of the magnetic drive. A power management element 62 supplies energy from the energy source 25 to the controller 35 and the magnetic field generators 30A, 30B. A status LED 64 shows the operation status of the magnetic drive.

The magnetometer 70 monitors the actual position of the magnetic drive in relation to the external magnetic field 10 (see FIG. 12) which then will allow controlling the power drivers 72 correctly. The controller 35 commands the power drivers 72 to provide electrical energy to the magnetic field generators 30A, 30B.

Figure 14:
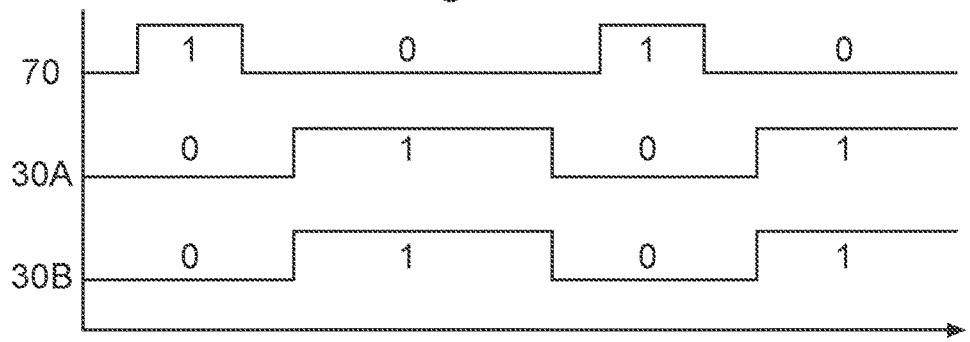
FIG. 14 schematically shows the states of some components of the controller of the magnetic drive.

FIG. 14 shows the activation of the magnetic field generators 30A, 30B and the measurement phase of the magnetometer 70. Basically, the magnetometer 70 is only activated (1) when the magnetic field generators 30A, 30B are in off state (0). The magnetometer 70 may provide correct measurement results only when the two magnetic field generators 30A, 30B are disabled (0).

Figure 15:
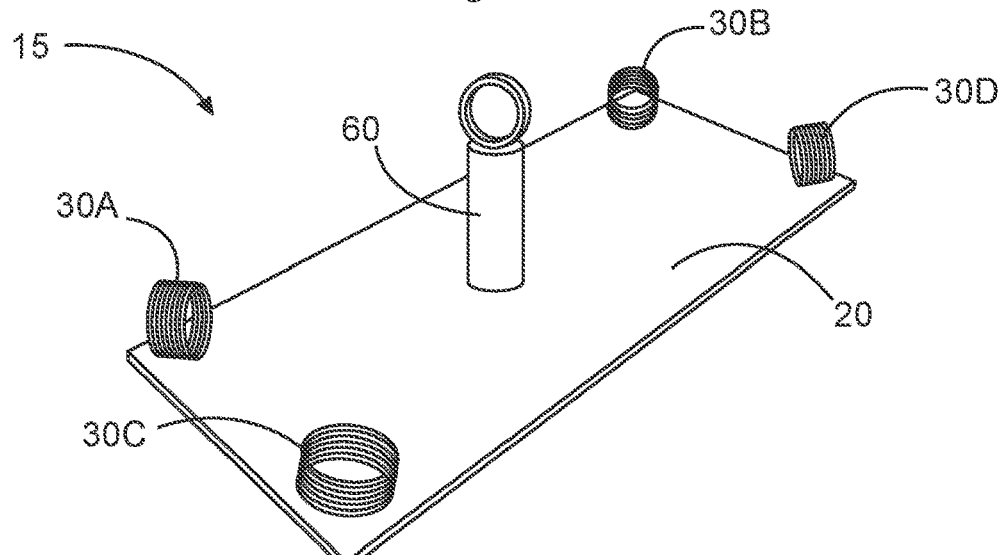
FIG. 15 schematically shows a design option of a magnetic drive.

FIG. 15 shows a magnetic drive 15 with four magnetic field generators 30A, 30B, 30C, 30D. A four-coil magnetic drive design may have more abilities and may be able to create more easily a twist and a translational or swinging movement pattern. Besides providing almost constant torque forces independently to the angular position (in relation to the assumed uniform EMF), it also can create a translational or swinging force in a desired direction. Effectively this means that this actuator design can create a linear motion force using magnetic forces only (no moving parts on the base plate).

Four air coils 30A, 30B, 30C, 30D are placed on the base plate 20 (for example a PCB with the dimensions 100 mm×100 mm), one in each corner. The air-cools are angled by 45 degree and face away from the central suspension 60.

The horizontally acting magnetic field strength B of the EMF in Europe can be assumed to be in average 0.5 Gauss or 5*10-5 T or 0.5 mT. This value might be different at other places in the world.

Depending on the actual physical design of the air-coil, an appropriate equation may be chosen. Below, a simplified equation is used.

$$B = \mu\_0 * \mu\_r * N/l(m) * I \quad (A)$$

where
$\mu_0$ is the permeability in space=$4\pi \; 10^{-7}$ Tm/A
T is Tesla, m is meter, and A is Ampere
$\mu_r$ is the relative permeability of the material chosen. In this case air $\mu_r=1$
$\pi$ is the Greek letter pi and is approximately 3.1415
l is the length of the inductor/coil in meter (m)
I is the electric current running through the air coil (A)
N is the number of windings in a single layer air-coil Now, the electric current needed to create a magnetic field strength of 0.5 Gauss ($5*10^{-5}$ T) can be calculated. With an air coil that is 2 cm long and has 50 wire turns:

$$\mu\_0 = 4 * \pi * [10]^{\wedge}(-7) \; Tm/A$$

$$I(A) = (B * l(m))/(\mu\_0 * \mu\_r * N)$$
$$= \frac{5 * [10]^{\wedge}(-5) * 2 * 10^{-2}}{4 * \pi * 10^{-7} * 1 * 50}$$
$$= 0.0159 \; A$$

The electric current needed to generate a 0.5 Gauss magnetic field is near 16 mA.

Figure 16:
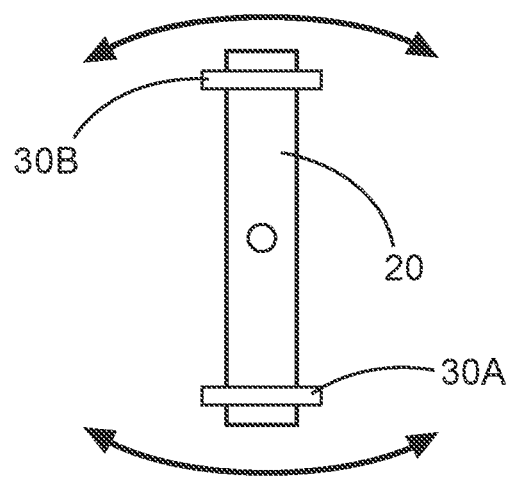
FIG. 16 schematically shows movement of a base plate of a magnetic drive.
Figure 17:
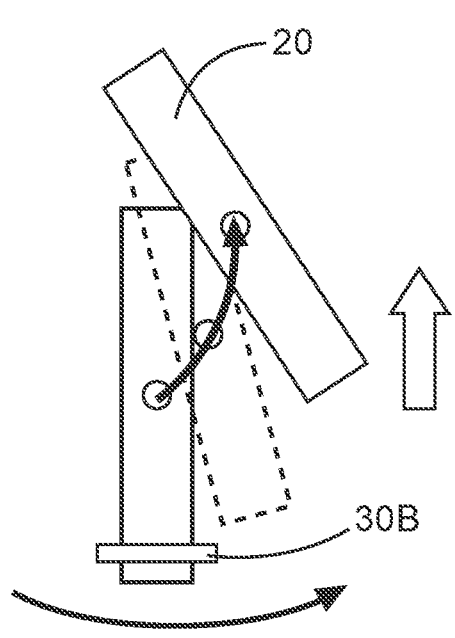
FIG. 17 schematically shows movement of a base plate of a magnetic drive.
Figure 18:
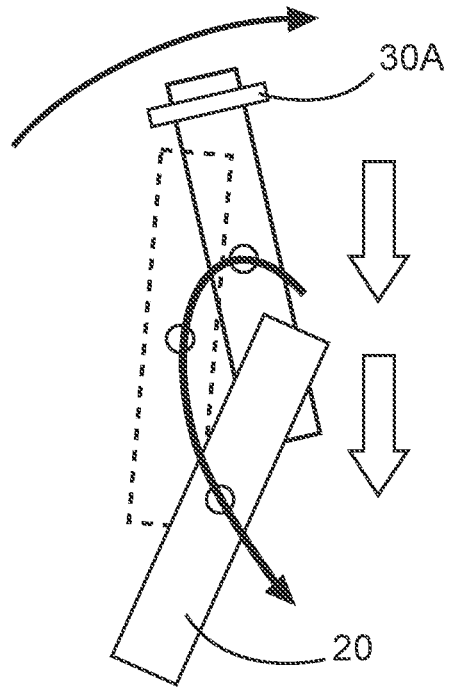
FIG. 18 schematically shows movement of a base plate of a magnetic drive.

FIGS. 16 to 18 show how a rotational force and movement is transformed into a translational force and movement. As explained above, the only mechanical force that can be created when operating within a uniform external magnetic field like the EMF is a rotational force, not a translational force.

FIG. 16 shows what happens when magnetic field generators 30A, 30B placed at the ends of the base plate 20 are activated simultaneously. The base plate 20 rotates either clockwise or counterclockwise, as indicated by the arrows in FIG. 16.

In FIGS. 17 and 18, only that magnetic field generator 30A, 30B is shown that is active for the indicated movement of the base plate. The magnetic field generators 30A, 30B are the source of the movement of the base plate.

FIG. 17 shows the movement of the base plate 20 when activating only the magnetic field generator 30B. The base plate rotates in a counterclockwise direction as a result of the rotational force applied to the magnetic field generator 30B.

After completing the movement of FIG. 17, the magnetic field generator 30B is deactivated and the magnetic field generator 30A is activated, so that the base plate moves as schematically shown in FIG. 18. The magnetic field generator 30A causes the base plate 20 to rotate clockwise. Due to the base plate's inertia momentum, the base plate 20 also executes a translational movement to the right, as described with reference to FIG. 5.

Figure 19:
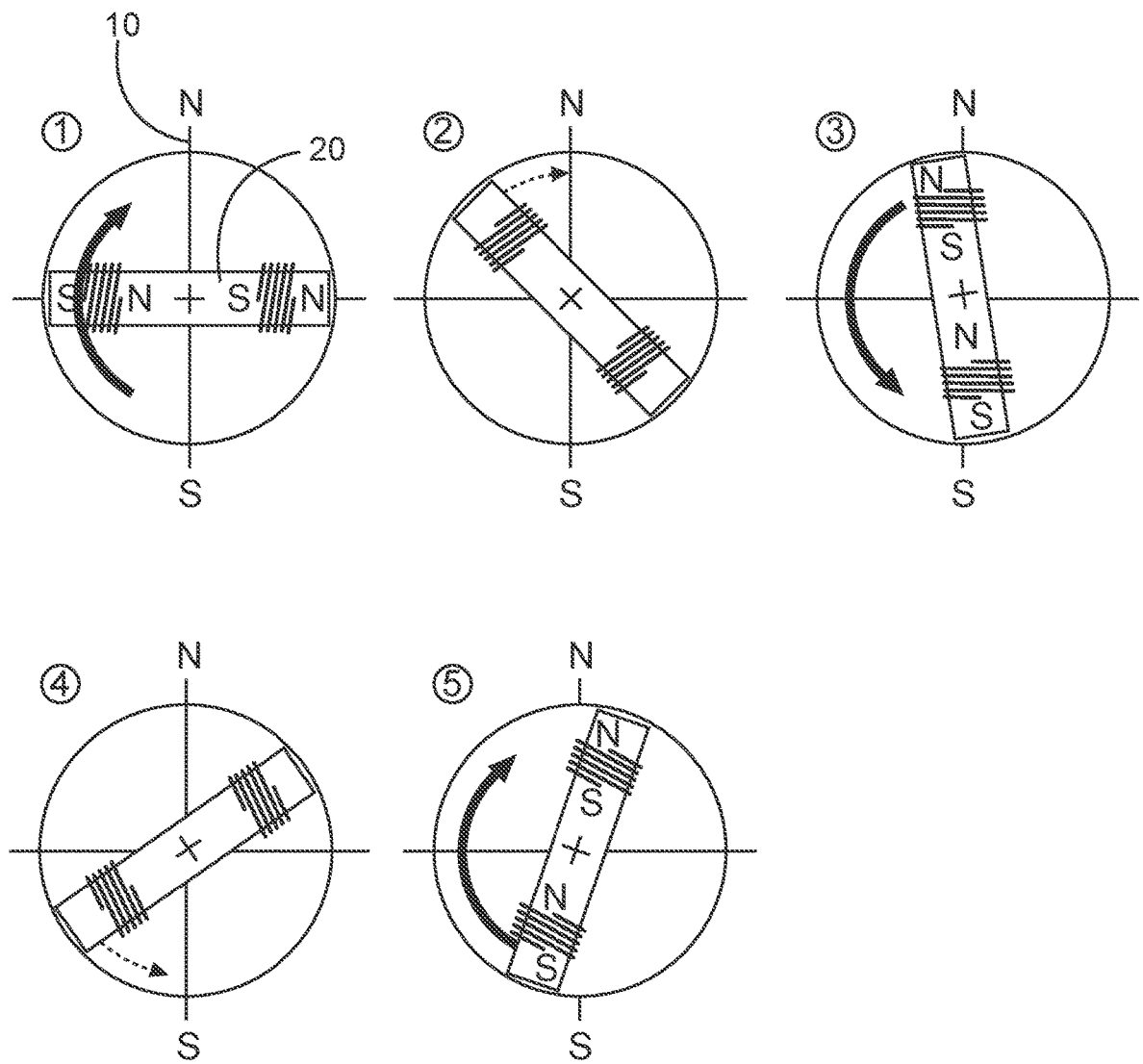
FIG. 19 schematically shows movement and control of a magnetic drive.

FIG. 19 shows the rotational movement and commanding of the magnetic drive to achieve the movement pattern shown in FIG. 5.

The magnetic drive is positioned within an external magnetic field 10 with its poles north (N) and south (S). The base plate 20 and two magnetic field generators placed at the opposite ends of the base plate are shown and represent the magnetic drive.

Shown at stage 1, the magnetic field generators are supplied with electrical energy so their south pole is on the right and their north pole is on the right. A clockwise rotational movement of the base plate results from this configuration since both magnetic field generators rotate clockwise within the external magnetic field 10.

Once the base plate achieves the position shown at stage 2, the energy supply to the magnetic field generators is stopped. This may be done when the base plate is between 15° and 30° from the field lines of the external magnetic field 10. The magnetic field generators are shown without any polarity since they are not driven by electric current at this stage. However, due to the base plate's inertia momentum, the base plate may rotate further in clockwise direction and approaching north and south poles of the external magnetic field 10. Before the base plate is parallel to the magnetic field lines of the external magnetic field, the clockwise rotation is stopped, and the magnetic field generators are driven with electric current of opposite polarity compared to the polarity in stage 1.

As can be seen at stage 3, the north poles of the magnetic field generators face the north pole of the external magnetic field and the south poles of the magnetic field generators face the south pole of the external magnetic field. This configuration generates a force in the counterclockwise direction. The polarity of the electric current is held until the base plate rotates so that the north pole of the magnetic field generator approaches the south pole of the external magnetic field or vice versa. About 15° to 30° before the base plate is parallel to the magnetic field lines of the external magnetic field (stage 4), the electric current is stopped, and the base plate may rotate further. Before the base plate is parallel to the magnetic field lines of the external magnetic field, the magnetic field generators are again powered with electric current that has the polarity of stage 1. The polarity of the magnetic field generators of stage 5 is identical to the polarity of stage 1 and opposite to the polarity of stage 3.

Summing up, the magnetic field generators are powered with electrical energy so that they rotate with respect to an external magnetic field like the EMF. This rotational movement is applied to the base plate 20 which also rotates. The polarity of the electrical energy for powering the magnetic field generators is alternately changed so that the base plate rotates alternately in the clockwise and counterclockwise direction. This alternating rotation causes a translational movement of the base plate due to the inertia moment of the base plate and the magnetic drive so that a motion pattern as shown in and described with reference to FIG. 5.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

LIST OF REFERENCE SIGNS 10 magnetic field lines of the external magnetic field
15 magnetic drive
20 base plate
22 longitudinal axis
25 energy source
30 magnetic field generator
32 generated magnetic field
35 controller, control unit
40 switching circuit
50 Helmholtz-coil
52 magnetic field
54 air coil
60 suspension
62 power management
64 status LED
66 serial interface
68 wireless interface
70 magnetometer
72 current driver

The invention claimed is:

1. A magnetic drive configured to interact with an external magnetic field, comprising:
a base plate;
an electrical energy source mounted to the base plate;
a control unit;
a first magnetic field generator mechanically coupled to the base plate; and
a switching circuit,
wherein the energy source and the first magnetic field generator are interconnected by the switching circuit,
wherein the control unit is configured to control the switching circuit to provide energy to the first magnetic field generator,
wherein the first magnetic field generator is configured to generate a magnetic field when being supplied with energy,
wherein the control unit is configured to control the switching circuit to achieve a desired polarity of the generated magnetic field to interact with the external magnetic field so that a rotational force is generated to rotate the first magnetic field generator within the external magnetic field, and wherein the external magnetic field is the earth's magnetic field.

2. The magnetic drive of claim 1, wherein the control unit is configured to selectively change a connection scheme of the switching circuit and to control a polarity of the generated magnetic field depending on a relative orientation of the first magnetic field generator with respect to magnetic field lines of the external magnetic field, thus achieving that the poles of the generated magnetic field are attracted or repelled by the poles of the external magnetic field and a force is exerted onto the first magnetic field generator.

3. The magnetic drive of claim 1, wherein an intensity of the generated magnetic field is between 0.1 and 10.0 of an intensity of the external magnetic field.

4. The magnetic drive of claim 1, wherein an intensity of the generated magnetic field is between 0.5 and 2.0 Milli-Tesla, mT of an intensity of the external magnetic field.

5. The magnetic drive of claim 3, wherein the intensity of the generated magnetic field is between (a) 0.05 and 0.5 Milli-Tesla, mT or (b) 0.1 and 0.2 Milli-Tesla, mT.

6. The magnetic drive of claim 1, wherein the first magnetic field generator is a coil and wherein the coil has between 10 and 1000 windings.

7. The magnetic drive of claim 6, wherein the coil has between 50 and 1000 windings.

8. The magnetic drive of claim 1, wherein the first magnetic field generator is supplied with electric energy when an angle of a central axis of the first magnetic field generator with respect to field lines of the external magnetic field is larger than 5° and smaller than 175° and wherein the first magnetic field generator is not supplied with electric energy when the angle of the central axis of the first magnetic field generator with respect to the field lines of the external magnetic field is out of the angle value ranges.

9. The magnetic drive of claim 8, wherein the external magnetic field is (a) larger than 10° and smaller than 170°, (b) larger than 15° and smaller than 165°, (c) larger than 20° and smaller than 160°, (d) larger than 25° and smaller than 155°, or (e) larger than 30° and smaller than 150°.

10. The magnetic drive of claim 1, further comprising:
a second magnetic field generator mounted to the base plate and spaced apart from the first magnetic field generator.

11. The magnetic drive of claim 10, wherein the first and second magnetic field generators are arranged so that their central axes are coaxial and coincide.

12. The magnetic drive of claim 10, further comprising:
third and fourth magnetic field generators.

13. The magnetic drive of claim 12, wherein central axes of the third and fourth magnetic field generators coincide and are coaxial.

14. The magnetic drive of claim 12, wherein a central axis of the third magnetic field generator intersects a central axis of the first magnetic field generator at an angle between 70° and 110°.

15. The magnetic drive of claim 12, wherein a central axis of the third magnetic field generator is orthogonal with respect to a central axis of the first magnetic field generator.

16. The magnetic drive of claim 10, wherein the control unit is configured to supply the first and second magnetic field generators with electric current so that north-poles of the first and second magnetic field generators point in the same direction and wherein the control unit is configured to change the polarity of the electric energy supplied to the first and second magnetic field generators once the first and second magnetic field generators pass a north and south-pole of the external magnetic field.

17. The magnetic drive of claim 10, wherein the control unit is configured to supply the first and second magnetic field generators with electric current in an alternating manner so that north-poles of the first and second magnetic field generators point in opposite directions.

18. The magnetic drive of claim 10, wherein the control unit is configured to supply the first and second magnetic field generators with electric current to exclusively one magnetic field generator at a time and so that north-poles of the first and second magnetic field generators point in opposite directions.

19. The magnetic drive of claim 17, wherein the control unit is configured to maintain the polarity of the electric energy supplied to at least one of the first and second magnetic field generators as long as a first moving direction of the base plate with respect to the external magnetic field remains the same and wherein the control unit is configured to change the polarity of the electric energy supplied to the at least one of the first and second magnetic field generators to generate a force that acts on the base plate with respect to the external magnetic field in a direction opposite to the first moving direction.

* * * * *